United States Patent [19]
Murray et al.

[11] Patent Number: 6,138,462
[45] Date of Patent: Oct. 31, 2000

[54] REFRIGERANT RECOVERY AND RECHARGING SYSTEM WITH AUTOMATIC OIL DRAIN

[75] Inventors: Walter D. Murray, Pioneer; William C. Brown, Bryan; Gary P. Murray, Montpelier, all of Ohio

[73] Assignee: SPX Corporation, Muskegon, Mich.

[21] Appl. No.: 09/273,212

[22] Filed: Mar. 19, 1999

[51] Int. Cl.[7] .......................... F25B 45/00; F25B 43/04
[52] U.S. Cl. .................. 62/149; 62/84; 62/192; 62/195
[58] Field of Search ............... 62/149, 192, 195, 62/84, 126

[56] References Cited

U.S. PATENT DOCUMENTS

| | | |
|---|---|---|
| 4,261,178 | 4/1981 | Cain . |
| 4,363,222 | 12/1982 | Cain . |
| 4,364,236 | 12/1982 | Lower et al. . |
| 4,441,330 | 4/1984 | Lower et al. . |
| 4,688,388 | 8/1987 | Lower et al. . |
| 4,755,957 | 7/1988 | White et al. .................. 62/149 X |
| 5,042,271 | 8/1991 | Manz . |
| 5,095,713 | 3/1992 | Laukhuf et al. . |
| 5,127,239 | 7/1992 | Manz et al. . |
| 5,172,562 | 12/1992 | Manz et al. . |
| 5,181,391 | 1/1993 | Manz . |
| 5,182,918 | 2/1993 | Manz et al. . |
| 5,193,351 | 3/1993 | Laukhuf et al. . |
| 5,199,271 | 4/1993 | Ewer .................................... 62/84 |
| 5,203,177 | 4/1993 | Manz et al. . |
| 5,209,077 | 5/1993 | Manz et al. . |
| 5,211,024 | 5/1993 | Manz et al. . |
| 5,231,842 | 8/1993 | Manz et al. . |
| 5,261,249 | 11/1993 | Manz et al. . |
| 5,285,647 | 2/1994 | Manz et al. ..................... 62/129 X |
| 5,417,075 | 5/1995 | Manz . |
| 5,582,019 | 12/1996 | Hanna et al. .................. 62/195 X |
| 5,582,023 | 12/1996 | O'Neal ............................. 62/195 |
| 5,603,223 | 2/1997 | Murray et al. ...................... 62/84 |

*Primary Examiner*—Corrine McDermott
*Assistant Examiner*—Chen-Wen Jiang
*Attorney, Agent, or Firm*—Price, Heneveld, Cooper, DeWitt & Litton

[57] ABSTRACT

A conduit is coupled to an oil accumulator with an orifice coupled in series with the conduit for limiting the flow of oil therethrough. A pressure sensor is coupled to the conduit for measuring the pressure in the conduit. An oil drain control solenoid valve is coupled to an electrical circuit also coupled to the pressure sensor for selectively opening the oil drain for the draining of oil into a collection tank without losing refrigerant.

9 Claims, 3 Drawing Sheets

REFRIGERANT RECOVERY AND RECHARGING SYSTEM WITH AUTOMATIC OIL DRAIN

BACKGROUND OF THE INVENTION

The present invention relates to an apparatus and method for servicing refrigeration systems and particularly to a system which includes the automatic draining of recovered oil from an oil accumulator.

During servicing of refrigeration circuits, such as the air conditioning system of a vehicle, upon evacuating the circuit, lubricating oil contained within the refrigerant is also withdrawn. During the recovery and evacuation steps, old oil is separated from the refrigerant by an accumulator or oil separator. The separated oil is collected in a graduated container allowing measurement of removed oil and permitting the operator to recharge the system with additional fresh oil equivalent to that removed.

U.S. Pat. No. 4,364,236 discloses an oil recovery system in which the oil recovered from a separator is collected in a graduated bottle utilizing a manually operated control valve. Although this system accurately measures the recovered oil, it requires intervention of the operator of the system as well as requiring time to allow the oil to drain once the manually operated valve is opened. An improvement to the manually operated valve incorporates a solenoid valve which is opened for a selected period of time to drain oil from the oil separator. In order to fully drain the oil, it was necessary, however, to select a time period which frequently allowed excess loss of refrigerant.

There remains a need, therefore, for an oil recovery system in which oil separated from a refrigerant circuit is automatically drained into a measurement vessel during the recovery process without loss of refrigerant.

SUMMARY OF THE INVENTION

The system and method of the present invention provides a pressure sensor which actuates a valve, allowing refrigerant to force oil from an accumulator through a metered orifice into a collection vessel. In a preferred embodiment of the invention, the pressure sensor controls an oil drain valve between predetermined pressure limits, allowing the oil to be forced from the accumulator without loss of refrigerant. Systems embodying the present invention include a conduit coupled to the bottom of an oil separator or accumulator, an orifice in series with the conduit for limiting the flow of oil therethrough, a pressure sensor coupled to the conduit for measuring the pressure, and an oil drain solenoid valve controlled by an electrical circuit coupled to the pressure sensor and to the oil drain solenoid for selectively opening the oil drain valve for the draining and subsequent measuring of oil from the refrigerant circuit being serviced. The method of automatically draining oil from the oil accumulator comprises the steps of selectively opening an oil drain conduit coupled to the accumulator through an orifice in response to pressure changes to allow liquid refrigerant to force oil through the drain, including the orifice.

Thus, with the system of the present invention, an automatic drain is provided which is controlled by sensing the pressure in the drain conduit and permitting the rapid draining of oil without loss of refrigerant. These and other features, objects and advantages of the present invention will become apparent upon reading the following description thereof together with reference to the accompanying drawings.

DETAILED DESCRIPTION OF THE PREFERRED EMBODIMENT

Figure 1:
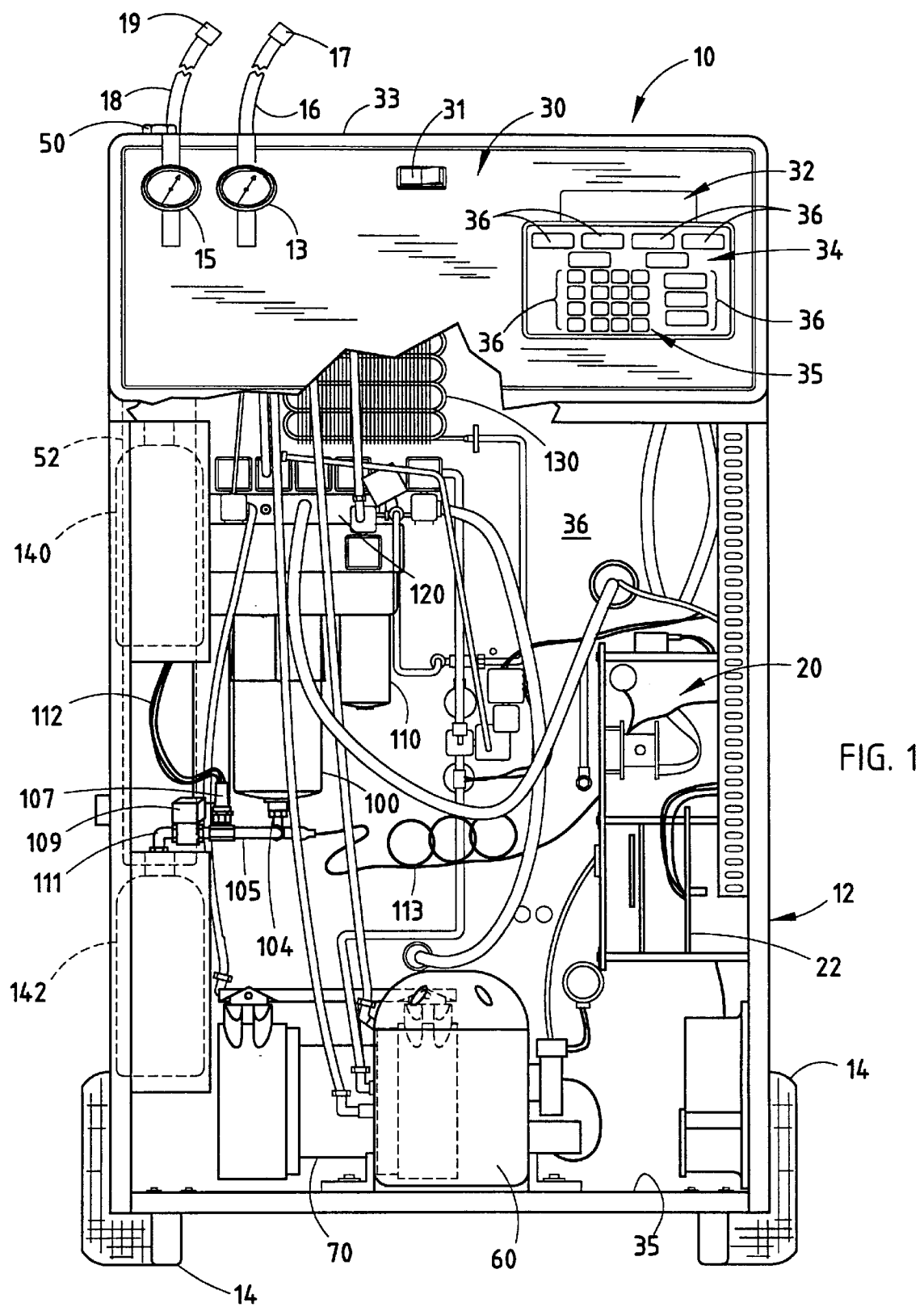
FIG. 1 is a front elevational view, partly broken away, of a refrigerant maintenance system for a vehicle which incorporates the present invention.

Referring initially to FIG. 1, there is shown a maintenance unit 10 for coupling to a refrigerant circuit such as a vehicle's air conditioning system for its maintenance. The unit 10 comprises a portable machine mounted within a cabinet 12 supported by a pair of wheels 14, such that it can be conveniently moved to the situs of a vehicle. Unit 10 includes a high pressure hose 16, typically color coded red, with a coupling 17 for coupling to the vehicle's high pressure port and a low pressure hose 18, typically color coded blue, having a coupling 19 for coupling to the low pressure port of the vehicle's refrigerant circuit. The front panel of the cabinet is shown broken away in FIG. 1 to show the major elements of the system which are also identified by similar numbers in the flow diagram of FIG. 2.

Figure 2:
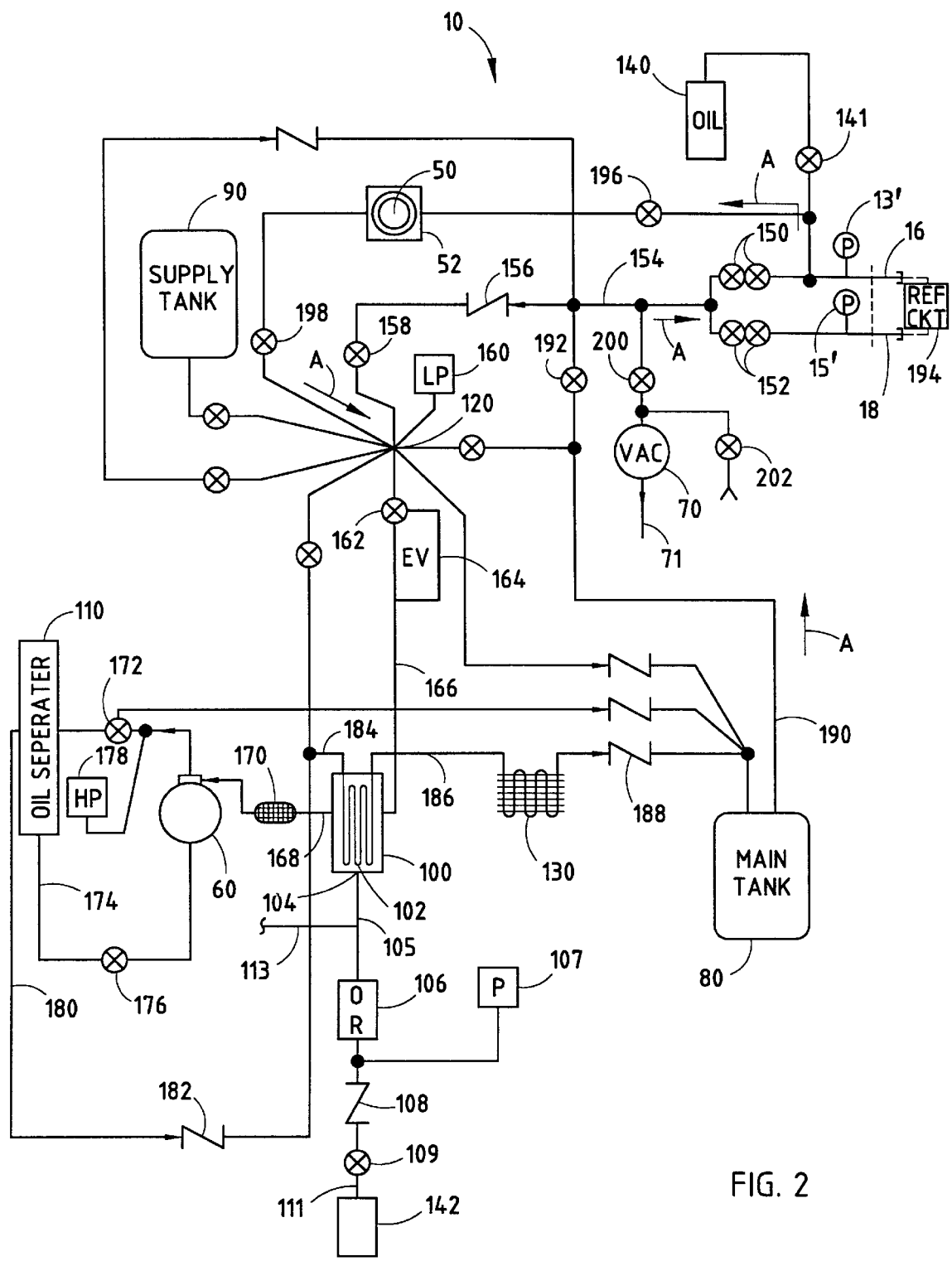
FIG. 2 is a flow diagram of the refrigerant recovery, flushing, evacuation, and recharging system incorporated in the system shown in FIG. 1.

The maintenance unit 10 includes an electronic module 20 integrally including a microprocessor on a circuit board 22 for controlling the electromechanical solenoid valves shown in the flow diagram of FIG. 2 and for receiving input information from the pressure sensors and control switches included on the control panel 30 shown in FIG. 1. The control panel 30 includes an on/off switch 31 and a display 32 for displaying the operational status of the machine operation, which display may be an LCD display or other suitable electronic display coupled to the microprocessor via a conventional input/output circuit. The display panel 30 further includes a switch panel 34 having a conventional keyboard 35 and a plurality of push-button switches 36 for controlling the operation of the machine through its various phases of operation and/or for selecting parameters for display. Thus, the keyboard 35 in conjunction with the operational switches 36 and display 32 allow the operator to enter the desired operational parameters for the machine according to manufacturer specifications for the servicing of an air conditioner unit in a particular vehicle.

The input hoses 16 and 18 are coupled to mechanical pressure gauges 13 and 15, respectively, which are mounted on the front panel of the service unit 10, as seen in FIG. 1. In addition, electrical pressure transducers 13' and 15' are coupled to the hoses 16 and 18, as shown in FIG. 2, and are coupled to the microprocessor through conventional input/output circuits to provide the microprocessor with information as to the current pressure in the hoses during operation of the unit. Gauges 13 and 15 provide the operator with a conventional analog display of the pressure as well. Mounted to the top surface 33 of cabinet 12 is a sight gauge 50 which also includes an integral replaceable filter cartridge 52 mounted to the cabinet for filtering particulate material from the refrigerant during the flushing cycle as described in greater detail below.

Mounted to the floor 35 of cabinet 12 is a compressor 60 and a vacuum pump 70. A main tank 80 and a supply tank 90 of refrigerant (FIG. 2) for the supply of refrigerant to the system are mounted behind the front of cabinet 12 on an extension of floor 35. The secondary supply tank 90 supplies make-up refrigerant to the main tank 80 as described in connection with the concurrently filed, copending application Ser. No. 09/272,789 entitled BACKGROUND TANK FILL, filed concurrently herewith, the disclosure of which is incorporated herein by reference. Mounted to the rear wall 36 of cabinet 12 is an oil accumulator tank 100, a compressor oil separator filter 110, a manifold 120 shown as a node in FIG. 2, and a condenser 130. In addition, a fresh oil canister 140 is mounted within a side compartment of cabinet 12. A recovery oil container 142 is mounted on the lower part of the cabinet to receive oil drained from the accumulator 100. Having briefly described the major components of the refrigerant servicing unit 10 shown in FIGS. 1 and 2, a more detailed description of the system follows in connection with the FIG. 2 diagram.

Initially, the hoses 16 and 18 are coupled to the vehicle and the recovery cycle is initiated by the opening of the dual back-to-back high pressure and low pressure solenoids 150, 152, respectively. This allows the refrigerant within the vehicle to flow through conduits 154 through check valve 156 and recovery valve 158 into the manifold 120. A low pressure switch 160 senses the pressure and provides an output signal coupled to the microprocessor through a suitable interface circuit which is programmed to detect when the pressure has recovered refrigerant down to 13 inches of mercury. The refrigerant then flows through valve 162 and unit 164 via conduit 166 into the accumulator 100 where it travels through an output conduit 168 through a water separating molecular sieve 170 to the input of compressor 60. Compressor 60 draws the refrigerant through the compressor through a valve 172 and through the oil separating filter 110 for the compressor which circulates oil back to the compressor through conduit 174 and oil return valve 176. A pressure transducer 178 is coupled to the microprocessor which is programmed to determine the upper pressure limit of, for example, 435 psi to shut down the compressor in the event the pressure becomes excessive. The compressed refrigerant exits the oil separator through conduit 180, through check valve 182 and through a heating coil 102 in accumulator 100 via conduit 184. The heated compressed refrigerant flowing through coil 102 assists in maintaining the temperature in accumulator 100 within a working range. The refrigerant then flows through conduit 186 to the condenser 130 which cools the compressed refrigerant which next flows through check valve 188 and into the main tank 80.

Figure 3:
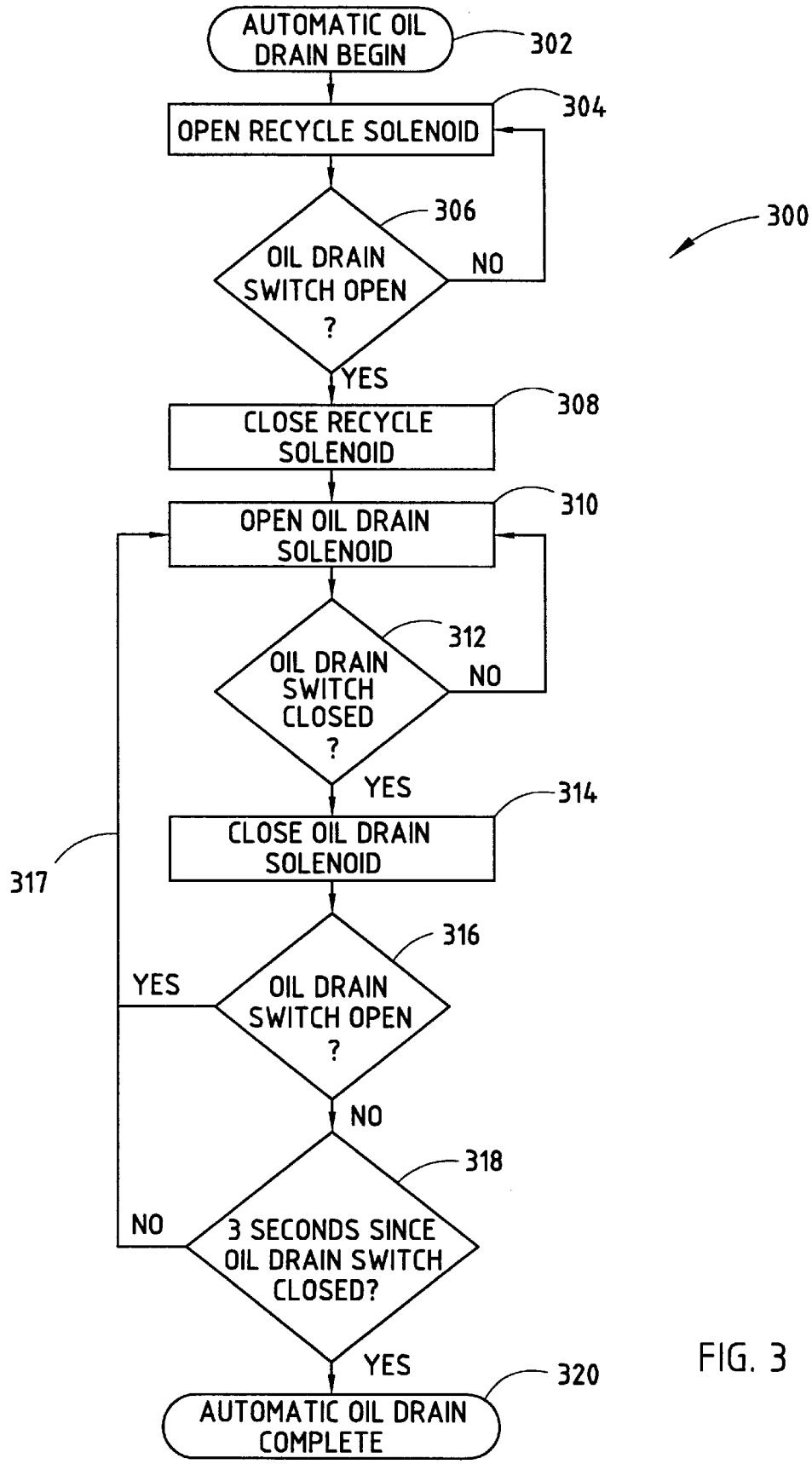
FIG. 3 is a flow diagram of the program for the microprocessor employed to control the oil drain system of the present invention.

During the recovery and flushing processes, oil is separated from the recovered refrigerant into the accumulator/oil separator 100, which comprises a generally cylindrical tank as seen in FIG. 1, having a drain 104 at the bottom thereof (FIGS. 1 and 2) which communicates with a conduit 105 coupled to an orifice 106 for restricting oil flow. Orifice 106 is an inline fitting which is hidden in FIG. 1 but which is shown in FIG. 2 in block form. Orifice 106 has a diameter of from about 0.035" to about 0.050" and preferably about 0.042" selected to limit the flow rate of oil from accumulator 100 to tank 142 preventing, in connection with the control of valve 109, the loss of refrigerant. A pressure sensing switch 107 is coupled to the junction of orifice 106 and a check valve 108. An electrically actuated solenoid 109 is coupled to collection bottle 142 through conduit 111. Suitable conductors 112 (FIG. 1) couple the pressure sensing switch 107 and electrically actuated solenoid 109 to the microprocessor carried on circuit board 22 by means of conventional interface circuits. The oil drain 104 is also coupled by conduit 113 to an oil separator (not shown) associated with a refrigerant identifier instrument which can be integrated into the maintenance unit 10 and which does not form a part of the present invention other than to note that the oil drains through conduit 113 from the oil separator associated with such unit into the oil recovery tank 142 utilizing common conduit 105. The operation of the automatic oil drain system is best understood with reference to FIG. 3.

At the end of the recovery and flushing process as described in greater detail in pending U.S. patent application Ser. No. 09/272,868 entitled REFRIGERANT RECOVERY AND RECHARGING SYSTEM WITH AUTOMATIC FLUSHING filed concurrently herewith, the disclosure of which is incorporated herein by reference, the accumulator tank 100 includes recovered oil from the vehicle's air conditioning system or other refrigeration circuit being serviced. After the completion of the flushing process, the automatic oil drain subroutine 300 programmed into the microprocessor is begun, as indicated by block 302. Initially, the recycle solenoid 192 is opened, as indicated by block 304, to pressurize the system by allowing liquid refrigerant from tank 80 into the accumulator tank 100. The microprocessor monitors the oil drain pressure switch 107 and closes the recycle solenoid 192 once the oil drain switch detects a 16 psi pressure, as indicated by blocks 306 and 308, respectively.

Switch 107 in the preferred embodiment of the invention opens at 16 psi and closes at 9 psi. Upon detecting the 16 psi pressure, the microprocessor receives a signal from the opening of switch 107 to open the oil drain solenoid 109, as indicated by block 310, allowing oil to drain through orifice 106 located at the outlet of the accumulator and which limits how quickly the oil drains. During the draining process, the pressure drops between the accumulator and the oil drain switch 107, and the microprocessor monitors the pressure switch 107 to determine when pressure reaches 9 psi, as indicated by block 312, to provide a signal for closing the oil drain solenoid 109 when such event occurs, as indicated by block 314. Once the oil drain solenoid is opened, the microprocessor tests the state of the oil drain pressure switch 107 to determine whether it is open or closed, as indicated by block 312. If it remains open, the drain solenoid stays open as the program cycles through blocks 310, 312. Once the switch 107 closes indicating that 9 psi has been reached, the oil drain solenoid 109 is closed, as indicated by block 314. The program continues testing the oil drain switch 107, as indicated by block 316, to determine whether it is open or closed. Once it opens again, the drain solenoid is opened, as indicated by the loop 317 back to block 310. If the drain switch is not opened, the program tests at block 318 if it has been three seconds since the oil drain switch was closed. If not, the program cycles back to block 310, continuing the draining process. If it has been three seconds or longer since the oil drain switch has been closed, however, the automatic oil drain sequence is completed, as indicated by block 320, and the drain solenoid 109 remains closed.

The microprocessor thus continues to monitor the status of switch 107 and controls the oil drain solenoid valve 109. By using the rise time of the pressure, the amount of refrigerant loss is kept to a minimum necessary only to push the recovered oil out of the accumulator regardless of the amount of oil. The pressure in the accumulator drops off relatively slowly until the oil is pushed through the orifice, then very rapidly drops as refrigerant vapor passes through, quickly ending the oil draining process. The check valve 108 prevents the oil drain solenoid from being forced open when there is a vacuum in the accumulator tank.

Upon completion of the recovery and flushing cycles, the operator views the amount of oil accumulated in tank 142 and injects oil from the fresh supply of oil 140 through valve 141 (FIG. 2) corresponding to the amount of recovered oil into the vehicle's air conditioning system or other refrigerant circuit being serviced during the recharging cycle described in the above-identified copending patent application. The electrically operated solenoid valve 141 may be controlled by the microprocessor to meter a precise amount of oil through entry of the fluid amount of oil necessary as entered by keyboard 35 based upon the amount of recovered oil. The new oil is supplied to the refrigerant circuit during the charging portion of the maintenance cycle.

Thus, it is seen with the system of the present invention, the recovered oil from a refrigerant circuit being serviced is automatically drained from the separator/accumulator with a minimal loss of refrigerant from the system, thereby providing an environmentally appropriate recovery system which allows the accurate determination of oil necessary to replace the recovered oil from the system. It accomplishes this goal without operator intervention, thereby greatly facilitating the collection or recovered oil.

It will become apparent to those skilled in the art that various modifications to the preferred embodiment of the invention as described herein can be made without departing from the spirit or scope of the invention as defined by the appended claims.

What is claimed is:

1. An oil recovery system for use with a refrigerant recovery system for maintenance of a vehicle's air conditioning system comprising:

a conduit for recovering refrigerant from a vehicle's air conditioning system;

an accumulator coupled to said conduit for separating oil from recovered refrigerant;

an oil drain coupled to said accumulator for draining oil therefrom;

an orifice coupled to said drain for limiting the flow rate of oil through said drain;

a pressure sensitive transducer coupled to said drain;

an oil drain solenoid valve coupled in series to said drain on a side of said valve opposite said accumulator;

an electrical control circuit coupled to said pressure sensitive transducer and oil drain solenoid valve for selectively opening and closing said oil drain solenoid valve in response to pressure changes for draining oil from the accumulator; and a supply of new oil and a valve coupled to said supply and to said control circuit for injecting a predetermined amount of new oil into said conduit for refilling the vehicles air conditioning system with oil.

2. The system as defined in claim 1 wherein said control circuit opens said solenoid valve at about 16 psi and closes said solenoid valve at about 9 psi.

3. The system as defined in claim 2 wherein said control circuit includes a microprocessor.

4. The system as defined in claim 3 wherein said orifice has a diameter of from about 0.035" to about 0.050".

5. The system as defined in claim 4 wherein said orifice has a diameter of about 0.040".

6. The system as defined in claim 1 wherein said orifice has a diameter of from about 0.035 to about 0.050.

7. The system as defined in claim 1 wherein said orifice has a diameter of 0.042.

8. The system as defined in claim 1 wherein said control circuit includes a microprocessor.

9. The system as defined in claim 1 wherein said control circuit opens said oil drain solenoid valve at about 16 psi and closes said oil drain solenoid valve at about 9 psi in response to pressure changes for draining oil from the accumulator.

* * * * *